(12) United States Patent
Kasagi

(10) Patent No.: US 11,467,876 B2
(45) Date of Patent: Oct. 11, 2022

(54) INFORMATION PROCESSING APPARATUS, INFORMATION PROCESSING METHOD AND NON-TRANSITORY COMPUTER-READABLE STORAGE MEDIUM FOR STORING INFORMATION PROCESSING PROGRAM OF DETERMINING RELATIONS AMONG NODES IN N-DIMENSIONAL TORUS STRUCTURE

(71) Applicant: FUJITSU LIMITED, Kawasaki (JP)

(72) Inventor: Akihiko Kasagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 16/675,282

(22) Filed: Nov. 6, 2019

(65) Prior Publication Data
US 2020/0192717 A1 Jun. 18, 2020

(30) Foreign Application Priority Data
Dec. 18, 2018 (JP) .............................. JP2018-236385

(51) Int. Cl.
*G06F 9/50* (2006.01)
*G06F 15/173* (2006.01)
(Continued)

(52) U.S. Cl.
CPC .......... *G06F 9/5027* (2013.01); *G06F 9/3822* (2013.01); *G06F 9/5066* (2013.01);
(Continued)

(58) Field of Classification Search
CPC .... G06F 9/5027; G06F 9/3822; G06F 9/5066; G06F 9/5072; G06F 13/362;
(Continued)

(56) References Cited

U.S. PATENT DOCUMENTS

| 7,644,254 B2 * | 1/2010 | Darrington | ............. H04L 45/02 |
| | | | 709/230 |
| 2003/0191855 A1 * | 10/2003 | Lee | ......................... H04L 45/06 |
| | | | 709/239 |

(Continued)

FOREIGN PATENT DOCUMENTS

| CN | 105224501 A * | 1/2016 | ............. H04L 41/12 |
| CN | 107612746 A * | 1/2018 | |

(Continued)

OTHER PUBLICATIONS

European Office Action dated Jul. 14, 2020 for corresponding European Patent Application No. 19207835.0, 7 pages. *US-2018/0205613-A1 cited herewith, was previously cited in an IDS filed on May 11, 2020.*

(Continued)

*Primary Examiner* — Abu Zar Ghaffari
(74) *Attorney, Agent, or Firm* — Fujitsu Patent Center

(57) ABSTRACT

An information processing apparatus for controlling a plurality of nodes mutually coupled via a plurality of cables, the apparatus includes: a memory; a processor coupled to the memory, the processor being configured to cause a first node to execute first processing to extract coupling relationship between the plurality of nodes, the first node being one of the plurality of nodes, being sequentially allocated from each of the plurality of nodes, the first processing including executing allocation processing that allocates unique coordinate information to the first node and allocates common coordinate information to nodes excluding the first node; executing transmission processing that causes the first node to transmit first information to each of the cables coupled to the first node; and executing identification processing that identifies a node having received the first information as neighboring (Continued)

node coupled to one of the plurality of cables coupled to the first node.

8 Claims, 13 Drawing Sheets

(51) Int. Cl.
*H04L 45/02* (2022.01)
*H04L 41/12* (2022.01)
*G06F 9/38* (2018.01)
*G06F 13/362* (2006.01)
*H04L 101/69* (2022.01)
*H04L 45/00* (2022.01)

(52) U.S. Cl.
CPC .......... *G06F 9/5072* (2013.01); *G06F 13/362* (2013.01); *G06F 15/17387* (2013.01); *H04L 41/12* (2013.01); *H04L 45/02* (2013.01); *G01D 2204/47* (2021.05); *G06F 15/17381* (2013.01); *H04L 45/26* (2013.01); *H04L 2101/69* (2022.05)

(58) Field of Classification Search
CPC ... G06F 15/17387; G06F 17/16; H04L 12/02; H04L 41/0806; H04L 41/12; H04L 45/26; H04L 61/609; H04L 61/2038; H04L 61/6004; H04L 67/10
See application file for complete search history.

(56) References Cited

U.S. PATENT DOCUMENTS

| | | | | |
|---|---|---|---|---|
| 2004/0003111 | A1* | 1/2004 | Maeda | H04L 45/02 709/237 |
| 2006/0087986 | A1* | 4/2006 | Dube | H04L 41/12 370/255 |
| 2008/0259816 | A1* | 10/2008 | Archer | G06F 30/18 370/254 |
| 2009/0052317 | A1* | 2/2009 | Takagi | H04L 41/12 370/223 |
| 2009/0113308 | A1* | 4/2009 | Almasi | G06F 11/3048 715/734 |
| 2012/0233621 | A1* | 9/2012 | Doi | G06F 9/5066 718/102 |
| 2013/0163472 | A1* | 6/2013 | Groleau | H04L 41/0806 370/255 |
| 2014/0044015 | A1* | 2/2014 | Chen | H04L 41/145 370/255 |
| 2015/0156103 | A1* | 6/2015 | Chang | G06Q 30/0223 370/241 |
| 2016/0314093 | A1 | 10/2016 | Usui | |
| 2016/0344618 | A1* | 11/2016 | Oprea | H04L 45/40 |
| 2017/0093619 | A1* | 3/2017 | Chen | G06F 16/951 |
| 2017/0093687 | A1* | 3/2017 | Wu | H04W 40/246 |
| 2017/0370808 | A1* | 12/2017 | Lester | G06F 30/15 |
| 2018/0139267 | A1* | 5/2018 | Choi | H04L 41/12 |
| 2018/0205613 | A1 | 7/2018 | Park et al. | |
| 2019/0273660 | A1* | 9/2019 | Yu | H04L 41/145 |

FOREIGN PATENT DOCUMENTS

| | | | | |
|---|---|---|---|---|
| JP | 6-266674 | | 9/1994 | |
| JP | 2016-207010 | | 12/2016 | |
| WO | WO-2010092638 | A1 * | 8/2010 | .......... H04L 12/462 |
| WO | WO-2012131631 | A1 * | 10/2012 | ............. H05B 47/19 |

OTHER PUBLICATIONS

EESR—The Extended European Search Report of European Patent Application No. 19207835.0 dated Feb. 11, 2020.
Chinese Office Action dated May 19, 2022 for corresponding Chinese Patent Application No. 201911166247.X, with English Translation, 17 pages. *Please note US-20180205613-A1 cited herewith, was previously cited in an IDS filed on May 11, 2020.*.
Japanese Office Action dated Aug. 9, 2022 for corresponding Japanese Patent Application No. 2018-236385, with English Translation, 13 pages. *Please note US-2018/0205613-A1 cited herewith, was previously cited in an IDS filed on May 11, 2020.*.

* cited by examiner

FIG. 3
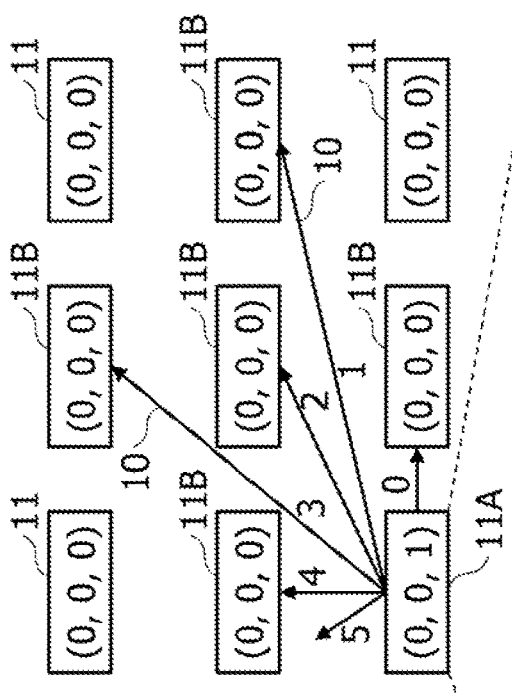
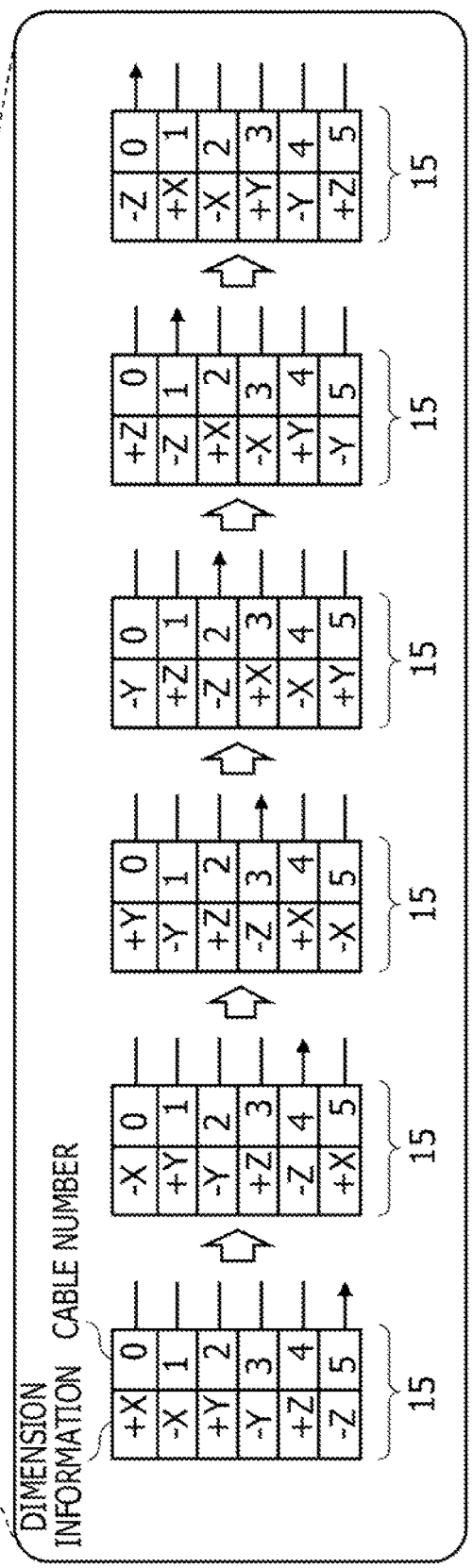

INFORMATION PROCESSING APPARATUS, INFORMATION PROCESSING METHOD AND NON-TRANSITORY COMPUTER-READABLE STORAGE MEDIUM FOR STORING INFORMATION PROCESSING PROGRAM OF DETERMINING RELATIONS AMONG NODES IN N-DIMENSIONAL TORUS STRUCTURE

CROSS-REFERENCE TO RELATED APPLICATION

This application is based upon and claims the benefit of priority of the prior Japanese Patent Application No. 2018-236385, filed on Dec. 18, 2018, the entire contents of which are incorporated herein by reference.

FIELD

The embodiments discussed herein are related to an information processing apparatus, an information processing method, and an information processing program.

BACKGROUND

In a network including a plurality of nodes (processors), a unique number is allocated to each of the nodes so that communication between the nodes may be performed. For example, a method has been proposed in which, after temporary processor numbers that does not overlap each other are allocated to a plurality of processors coupled to a network and the number of processors is recognized, real processor numbers are sequentially allocated. A supercomputer applying a six-dimensional mesh/torus network has been proposed.

Examples of the related art include Japanese Laid-open Patent Publication No. 6-266674, and Japanese Laid-open Patent Publication No. 2016-207010.

SUMMARY

According to an aspect of the embodiments, an information processing apparatus for controlling a plurality of nodes mutually coupled via a plurality of cables, the apparatus includes: a memory; a processor coupled to the memory, the processor being configured to cause a first node to execute first processing to extract coupling relationship between the plurality of nodes, the first node being one of the plurality of nodes, being sequentially allocated from each of the plurality of nodes, the first processing including executing allocation processing that allocates unique coordinate information to the first node and allocates common coordinate information to nodes excluding the first node; executing transmission processing that causes the first node to transmit first information to each of the cables coupled to the first node; and executing identification processing that identifies a node having received the first information as neighboring node coupled to one of the plurality of cables coupled to the first node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of extraction processing to be executed by an information processing apparatus in FIG. 1;

FIG. 8 illustrates an example of extraction processing that extracts a coupling relationship between nodes to be executed by an information processing apparatus in FIG. 5;

FIG. 9 illustrates a continuation of FIG. 8;

FIG. 10 illustrates a continuation of FIG. 9;

FIG. 11 illustrates an example of a coupling relationship between nodes found out after test packets are transmitted from all nodes and the processing illustrated in FIGS. 9 and 10 are executed thereon;

DESCRIPTION OF EMBODIMENTS

In a network including a plurality of nodes, identifications (ID) such as coordinates are allocated to each of the nodes in accordance with predetermined inter-node coupling specifications. In a case where each of the nodes determines a dimension direction (or cable) to transfer a packet based on a difference between the coordinates of the packet destination node and the coordinates of the node, each node may recognize which dimension direction the cable to which the node is coupled belongs to. In other words, for example, each of the nodes may not know the position of the packet destination node.

For example, in a case where systems each including a plurality of nodes are constructed by combining a plurality of servers and where the resulting systems have different numbers of nodes, the coupling conditions between nodes are different between systems. Therefore, before coordinates are allocated to the nodes, the coupling conditions between the nodes may be required to grasp. However, in a case where the dimension direction to transfer a packet is determined based on a difference between coordinates, the destination of a packet is not designated if coordinates are not allocated to nodes, and the packet may not be transmitted. Therefore, it is difficult to grasp the coupling conditions between nodes.

According to one aspect, it is an object of the embodiments to grasp coupling conditions between a plurality of nodes included in a network.

Embodiments will be described below with reference to drawings.

Figure 1:
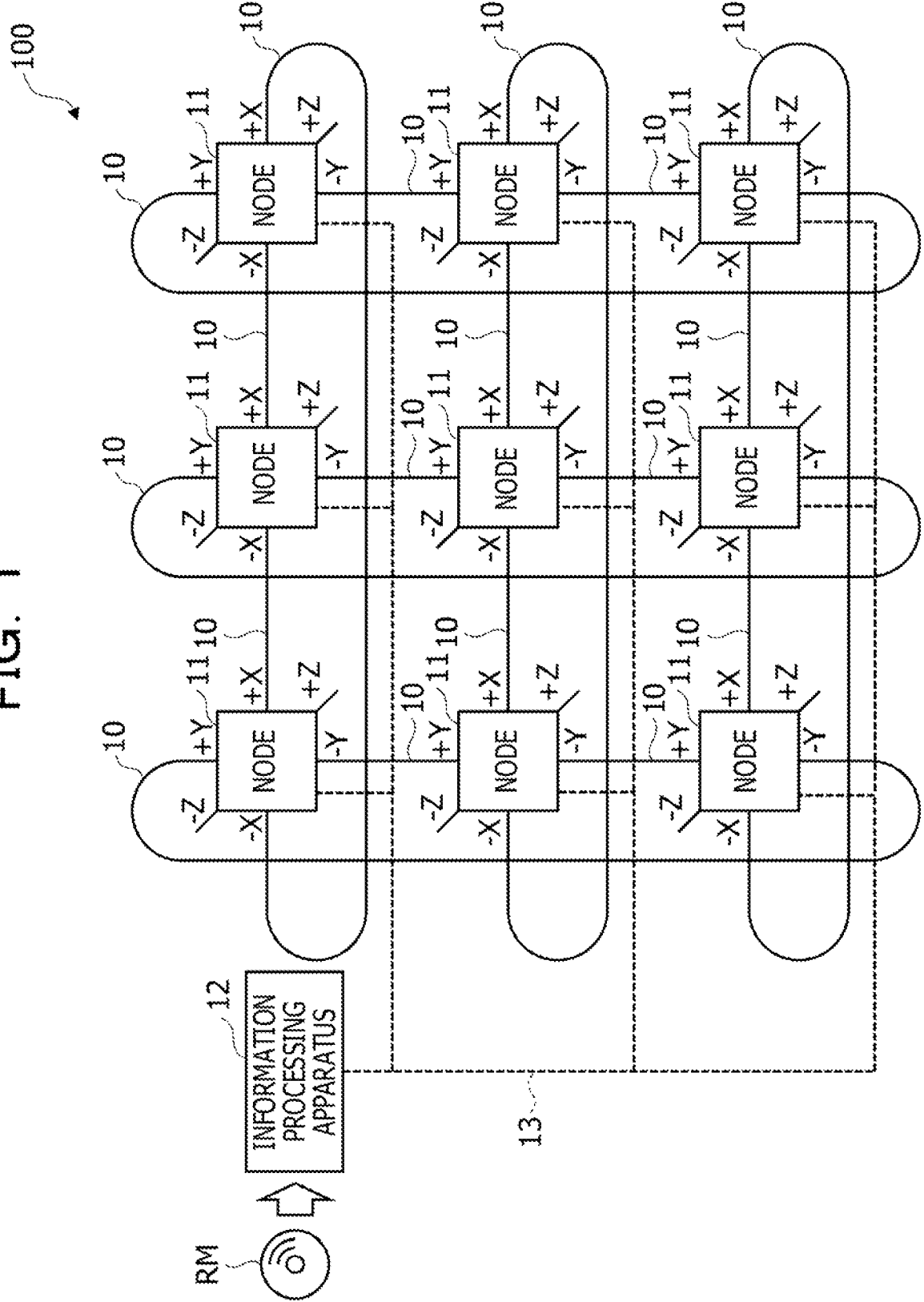
FIG. 1 illustrates an example of an information processing system including an arithmetic processing device according to an embodiment.

FIG. 1 illustrates an example of an information processing system including an information processing apparatus in an embodiment. An information processing system 100 illustrated in FIG. 1 has a plurality of nodes 11 coupled each other via a plurality of cables 10 and an information processing apparatus 12 commonly coupled to the nodes 11. For example, the information processing system 100 may cause a predetermined number of nodes to execute arithmetic operations to execute deep learning with a neural network. Though not particularly illustrated, each of the nodes 11 has, for example, a plurality of arithmetic units that execute arithmetic operations in parallel, an arithmetic operation centralized control unit that controls the plurality of arithmetic units, and a memory that holds data to be used for arithmetic operations and operation results. For example, the information processing system 100 is constructed by storing system boards including a predetermined number of nodes 11 in a rack, for example, and mutually coupling the nodes 11 via cables 10.

The information processing apparatus 12 is coupled with all of the nodes 11 via a communication line 13 different from the cables 10 included in the network and is communicable with all of the nodes 11. For example, the information processing apparatus 12 is a server and has a central processing unit (CPU) that executes an information processing program, a memory that stores the information processing program and a communication interface for communicating with a hard disk device and the nodes 11, for example.

The information processing apparatus 12 may have an input/output interface for coupling a recording medium RM such as a compact disk read-only memory (CD-ROM), a digital versatile memory (DVD) or a Universal Serial Bus (USB) memory that records the information processing program. In this case, the information processing program is stored in a hard disk device through the input/output interface. The information processing apparatus 12 executes the information processing program to execute extraction processing that extracts coupling information between nodes 11, which will be described below. The information processing apparatus 12 may monitor states of the nodes 11 to detect a failure at any one of the nodes 11 and to manage power supply to the nodes 11.

In the example illustrated in FIG. 1, a three-dimensional torus network is constructed with the plurality of cables 10 and the plurality of nodes 11. Each of the nodes 11 is coupled to six cables 10 to which an X axis (+X, −X), a Y axis (+Y, −Y) and a Z axis (+Z, −Z) are allocated. FIG. 1 does not illustrate nodes 11 coupled in the Z axes. Hereinafter, the X, Y, Z axes will also be called "dimensions", and the dimensions including the directions such as +X and −X will also be called "dimension information". The network constructed in the information processing system 100 may be other networks such as a mesh network and may have dimensions other than three dimensions.

To each of the nodes 11, coordinate information by which the position (coordinates) of the node 11 over a network is identifiable is allocated. The coordinate information includes coordinates such as (0,0,0) and (0,3,1) so that the position of the node 11 is identifiable over a coordinate space (X, Y, Z). In this embodiment, coordinates are allocated to the nodes 11 neighboring to each other via the cable 10 such that one of the dimensions is different by "1". For example, the coordinates of the node 11 neighboring to the node 11 at coordinates (3,3,3) are one of (2,3,3), (4,3,3), (3,2,3), (3,4,3), (3,3,2), (3,3,4). Hereinafter, the node 11 is described with coordinates such as node (2,3,3).

By using a dimension routing method, each of the nodes 11 first transfers a packet in the X axis direction up to the X axis coordinate of the destination node 11 and next transfers the packet in the Y axis direction up to the Y-axis coordinate of the destination node 11, for example. Then, the node 11 transfers the packet in the Z axis direction up to the Z axis coordinate of the destination node 11. Thus, the packet reaches the destination node 11. In other words, for example, each of the nodes 11 determines dimensions to transfer a received packet based on the difference between the coordinate information of the destination node 11 included in the received packet and the coordinate information of the node 11 and transfers the received packet to the cable 10 to which the determined dimension is allocated. For example, in order to transmit a packet from a node (0,0,1) to a node (1,1,3), the packet is sequentially transferred to the node (1,0,1), (1,1,1), (1,1,2) and (1,1,3).

Figure 2:
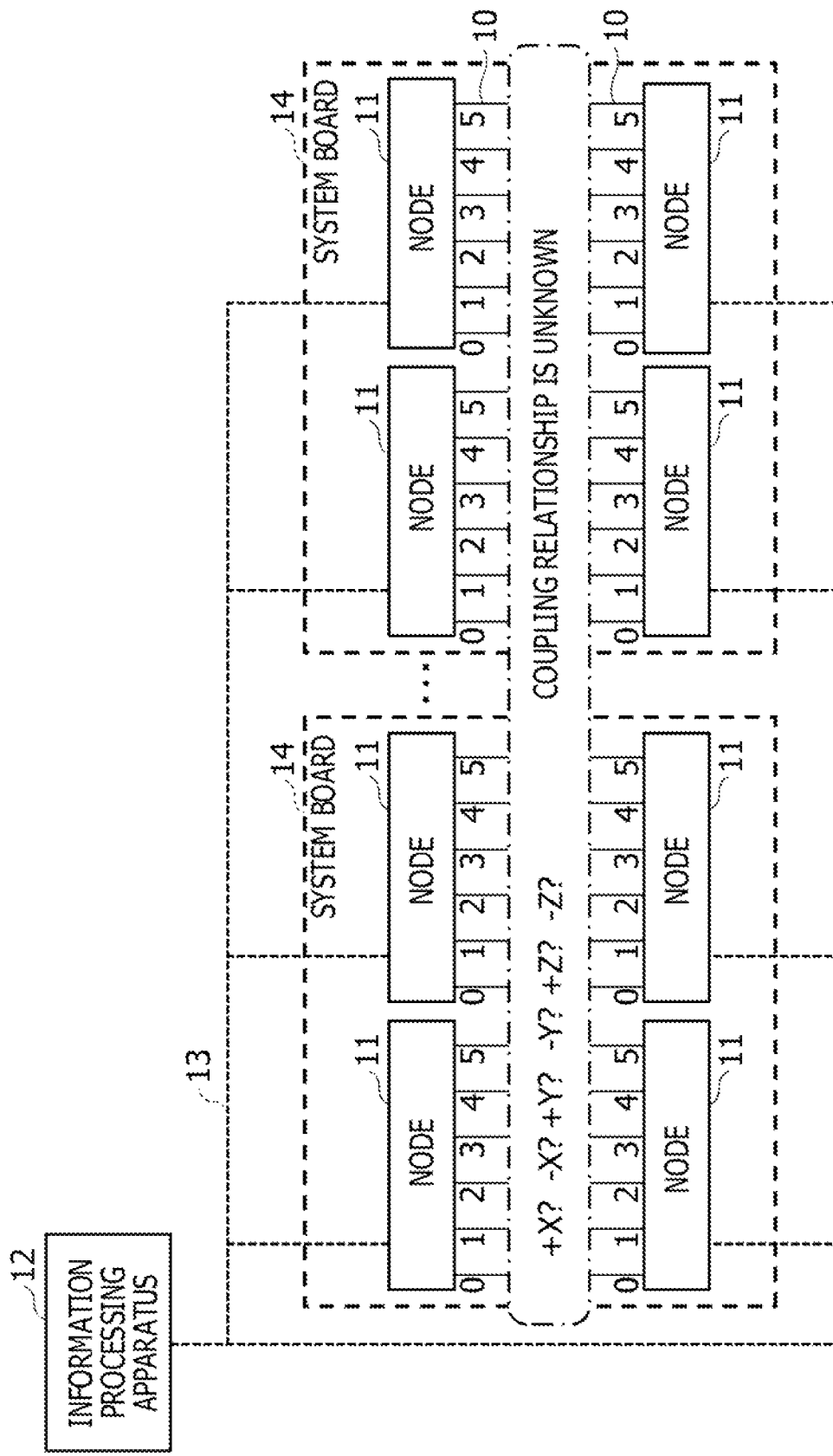
FIG. 2 illustrates an example of an initial state in a case where system boards including nodes are stored in a rack in FIG. 1.

FIG. 2 illustrates an example of an initial state in a case where system boards 14 including nodes 11 are stored in a rack in FIG. 1. When the system boards 14 are stored in a rack and nodes 11 are coupled by the cables 10, coordinates are not allocated to each of the nodes 11. Each of the nodes 11 recognizes a port number to which the cable 10 is coupled. In other words, for example, the coupling relationship between the nodes 11 is unknown.

Referring to FIG. 2, six port numbers to which the cables 10 are coupled are 0 to 5. Hereinafter, each of the port numbers will also be called a "cable number". At initial state, the cable numbers and dimension information are not associated, and the dimension information of the cables 10 coupled to the nodes 11 are not fixed. Accordingly, the information processing apparatus 12 executes the information processing program to execute extraction processing for extracting the coupling relationship between nodes 11. In other words, for example, the information processing apparatus 12 judges to which node 11 and through which cable 10 the nodes 11 are coupled.

FIG. 3 illustrates an example of the extraction processing to be executed by the information processing apparatus 12 in FIG. 1. First, the information processing apparatus 12 executes allocation processing that allocates unique coordinate information (X,Y,Z)=(0,0,1) to a node 11A that is one of the plurality of nodes 11 and allocates common coordinate information (X,Y,Z)=(0,0,0) to the remaining nodes 11. The node 11A to which the unique coordinate information is allocated is an example of a first node.

Next, the information processing apparatus 12 executes transmission processing that instructs the node 11A to transmit a test packet to each of the six cables 10 coupled to the node 11A. Information included in the test packet is an example of first information. For example, the unique coordinate information and the common coordinate information are different by "1" at Z of the dimensions X, Y, Z, Thus, when the destination coordinates of the test packet are (0,0,0), the test packet may be transmitted to the six nodes 11B directly connected to the node 11A through the cables 10. In other words, for example, in an initial condition in which coupling relationships between nodes 11 are unknown because it is before official coordinates are allocated to the nodes 11, the test packets may be received by the six nodes 11 coupled to the six cables 10.

The destination node (0,0,0) of the test packet is different by "−1" at the dimension direction Z from the source node (0,0,1) of the test packet. Thus, the node 11A transmits the test packet destined to the node (0,0,0) to the cable 10 in the dimension direction (−Z) based on information set at a dimension information register 15 that the node 11A has. The dimension information register 15 is an example of a registration unit with which a relationship between the cable 10 and the dimension allocated to the cable 10 is registered.

The dimension information register 15 is provided for each of the nodes 11 and has an area for storing dimension information (+X, −X, +Y, −Y, +Z, −Z) corresponding to the cable numbers (port numbers) as illustrated within the frame at the bottom of FIG. 3 and indicates which dimension direction the cable 10 is coupled. The information processing apparatus 12 updates the dimension information register 15 of the node 11A every transmission of a test packet sequentially slides the correspondence between dimension information (−z) and the cable number as illustrated in the transition in the direction indicated by the arrows within the frame at the bottom of FIG. 3. Thus, the node 11A may sequentially transfer packets to six nodes 11B (neighboring nodes) that are coupled with the node 11A in a neighboring manner among nodes 11 to which the common coordinate information (0,0,0) is allocated.

After that, the information processing apparatus 12 performs identification processing that searches through all of the nodes 11 to detect the nodes 11 having received the test packets so that the neighboring nodes 11B coupled with the six cables 10 coupled with the node 11A may be identified. A reception information holding unit that stores the numbers of the cables 10 that has received the test packets and identification information of the source node 11 of the test packets may be provided in each of the nodes 11. In this case, based on the information stored in the reception information holding unit in each of the nodes 11, the information processing apparatus 12 may execute the identification processing that identifies the neighboring nodes 11B coupled to the six cables 10 coupled to the node 11A.

After that, the information processing apparatus 12 executes the allocation processing, the transmission processing and the identification processing by sequentially changing the node 11A to which the unique coordinate information (0,0,1) is allocated. Thus, the neighboring nodes 11B coupled to six cables 10 coupled to all of the nodes 11 (11A) may be identified, and coupling relationships between all of the nodes 11 may be extracted. In other words, for example, which node 11 is coupled with which node 11 through which cable 10 may be recognized, and the coupling relationships in the network illustrated in FIG. 1 may be identified. After that, the information processing system 100 allocates coordinates to the nodes 11 based on the identified coupling relationships between nodes 11. Thus, a network including coordinate information may be constructed.

Figure 4:
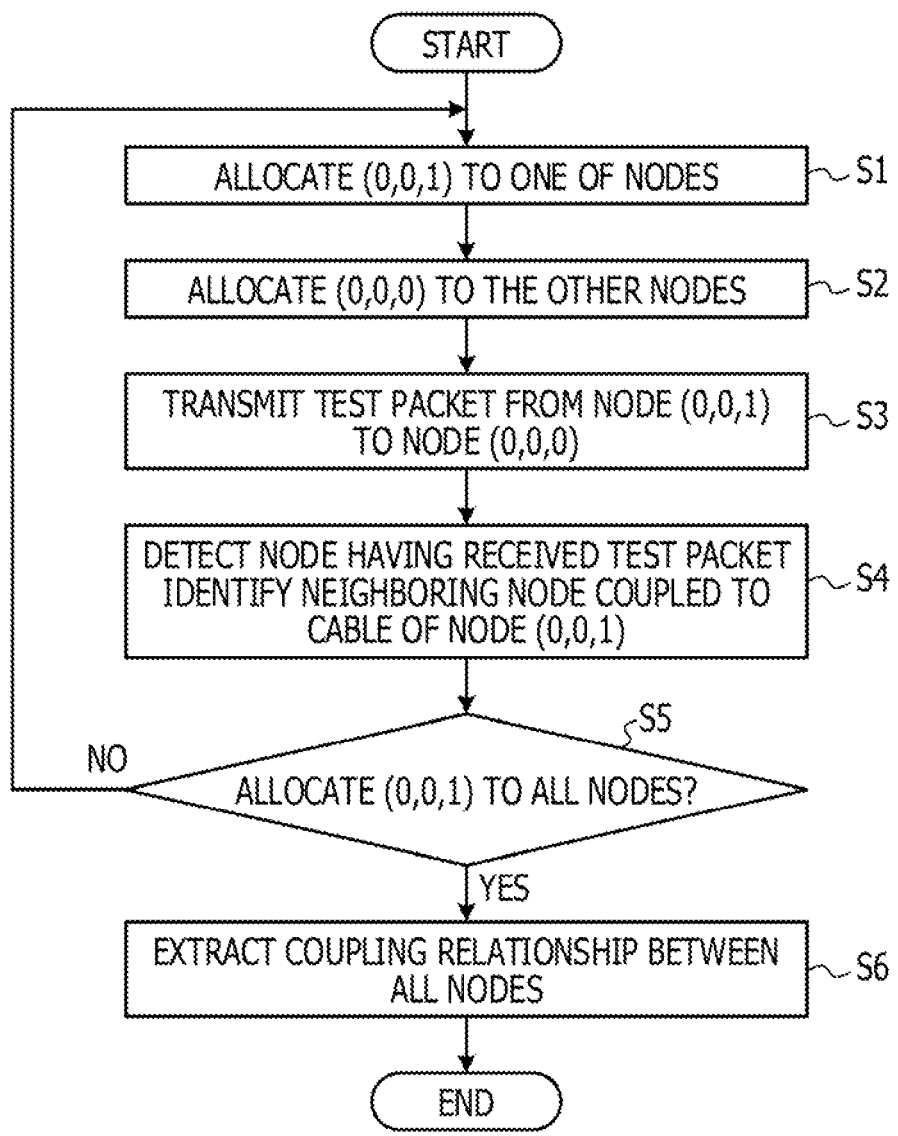
FIG. 4 illustrates an example of an operation flow of the information processing apparatus in FIG. 1.

FIG. 4 illustrates an example of an operation flow of the information processing apparatus 12 in FIG. 1. The flow illustrated in FIG. 4 is implemented by an information processing program executed by the information processing apparatus 12, for example. In other words, for example, FIG. 4 illustrates an example of an information processing method by the information processing apparatus 12 and an example of an information processing program.

First of all, in step S1, the information processing apparatus 12 allocates unique coordinate information (0,0,1) to one of the nodes 11. Next, in step S2, the information processing apparatus 12 allocates common coordinate information (0,0,0) to the remaining nodes 11. Next, in step S3, the information processing apparatus 12 causes the node (0,0,1) to transmit a test packet to the plurality of nodes (0,0,0) coupled to the node (0,0,1) through the cables 10 coupled to the node (0,0,1).

Next, in step S4, the information processing apparatus 12 searches through all of the nodes 11 to detect the nodes 11 that have received the test packet so that the neighboring nodes 116 coupled with the cable 10 of the node (0,0,1) are identified. Next, in step S5, when the information processing apparatus 12 allocates the unique coordinate information (0,0,1) to all of the nodes 11 and transmits a test packet, the information processing apparatus 12 advances the processing to step S6. When there is a node 11 to which the unique coordinate information (0,0,1) has not been allocated, the information processing apparatus 12 returns the processing to step S1.

In step S6, the information processing apparatus 12 extracts coupling relationships of all of the nodes 11 based on the information on the neighboring nodes identified for each of the nodes 11 to which the unique coordinate information (0,0,1) has been allocated and ends the processing.

According to the embodiment illustrated in FIG. 1 to FIG. 4, the node 11A to which unique coordinate information is to be allocated is sequentially slid. A test packet is transmitted from the node 11A, and the node 11 having received the test packet is identified as a neighboring node 116 coupled to the node 11A through the cable 10. Thus, in a network in which the coupling relationships between nodes 11 are not known, the coupling condition between the nodes 11 may be grasped.

The unique coordinate information to be allocated to the node 11A and the common coordinate information to be allocated to the other nodes 11 are different by "1" at one of dimensions. Thus, in an initial state before official coordinates are allocated to the nodes 11, a test packet is transmitted from the node 11A to the other nodes 11 so that the nodes 11 directly connected to the six cables 10 may receive the test packet.

The information processing apparatus 12 sequentially slides the correspondence between the dimension information (−Z) set in the dimension information register 15 for the node 11A and the cable number for each transmission of a test packet. Thus, for example, according to the dimension routing method, the node 11A may sequentially transfer a test packet to the neighboring nodes 118 directly connected to the node 11A among the plurality of nodes 11 to which the common coordinate information (0,0,0) is allocated.

Based on the coupling information between the nodes 11 identified by sequentially setting all of the nodes 11 to the node 11A to which the unique coordinate information is allocated, coordinate information is allocated to the nodes 11. Thus, a network including the coordinate information may be constructed. In other words, for example, irrespective of the number of the system boards 14 or the number of the nodes 11 to be stored in a rack, a network including coordinate information may be constructed, which may be operated as the information processing system 100 that executes information processing.

Figure 5:
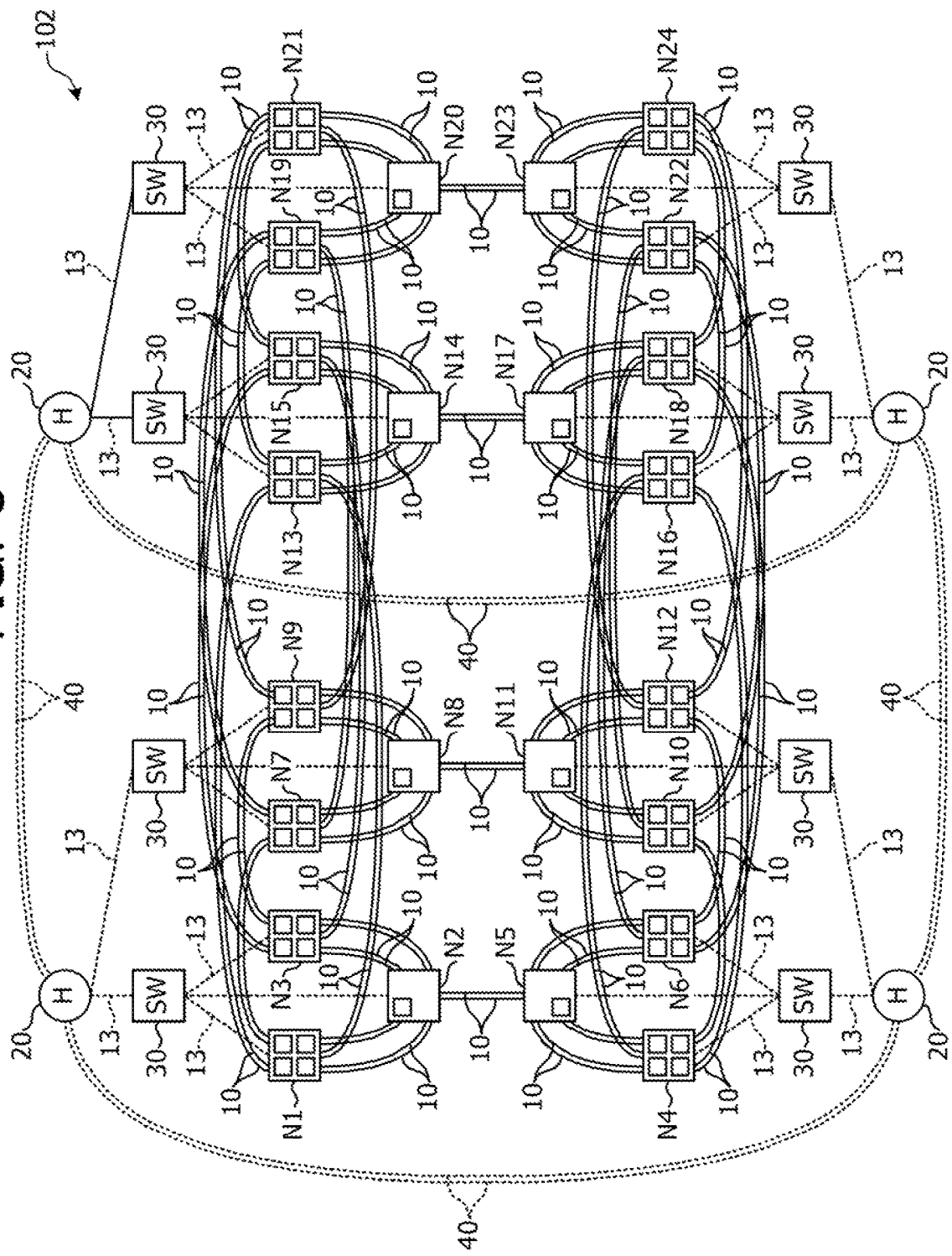
FIG. 5 illustrates an example of an information processing system including an information processing apparatus in another embodiment.

FIG. 5 illustrates an example of an information processing system including an information processing apparatus in another embodiment. Detailed description of elements and functions similar to the elements and the functions described in FIG. 1 is omitted. An information processing system 102 illustrated in FIG. 5 has 24 nodes N (N1 to N24) mutually coupled via a plurality of cables 10, a predetermined number of information processing apparatuses (H) 20 coupled to the nodes, and switches (SW) 30. For example, the information processing system 102 causes a predetermined number of nodes N to execute arithmetic operations to execute deep learning with a neural network.

The information processing apparatuses 20 are coupled with all of the nodes N via a communication line 13 different from the cables 10 and the switches 30 so that the information processing apparatuses 20 may communicate with all of the nodes N. Each of the switches 30 changes the transfer path for a packet to be transferred between the information processing apparatus 20 and the node N. The two information processing apparatuses 20 arranged in the vertical direction in FIG. 5 and the two information processing apparatuses 20 arranged in the horizontal direction in FIG. 5 are mutually coupled through two communication lines 40 so that the four information processing apparatuses 20 are mutually communicable.

For example, the information processing apparatus 20 is a server, like the information processing apparatus 12 illustrated in FIG. 1, and has a CPU that executes an information processing program, a memory that stores an information processing program, and a communication interface for communicating with a hard disk device and the nodes N. The information processing apparatus 20 may have an input/output interface that couples a recording medium RM recording an information processing program, like the information processing apparatus 12 illustrated in FIG. 1.

For example, the information processing system 102 illustrated in FIG. 5 is constructed by storing six system boards each including four nodes N in a rack and coupling the nodes N via the cables 10. The information processing apparatuses 20 may be placed inside or outside the rack. When the system boards 14 are stored in the rack and the nodes 11 are coupled via the cables 10, the information processing apparatus 20 does not recognize which node N is coupled with other nodes N via which cables 10. In other words, for example, the coupling relationship between the nodes N is not known. Accordingly, the information processing apparatus 20 executes extraction processing that extracts coupling information between nodes N as described with reference to FIG. 8 to FIG. 13.

Each node N is coupled with other nodes N via 10 cables, Nodes N1, N3, N4, N6, N7, N9, N10, N12, N13, N15, N16, N18, N19, N21, N22, and N24 have the same configuration as each other. Nodes N2, N5, N8, N11, N14, N17, N20, and N23 have the same configuration as each other. Hereinafter, each of the nodes N1, N3, N4, N6, N7, N9, N10, N12, N13, N15, N16, N18, N19, N21, N22, N24 will also be called a "node NA". Each of the nodes N2, N8, N5, N11, N14, N17, N20, and N23 will also be called a "node NB". The nodes NA have a higher processing performance than that of the nodes NB.

The information processing system 102 may have all the same nodes NA. The total number of the nodes N included in the information processing system 102 is not limited to 24 but may differ in accordance with the number of system boards to be stored in a rack or the number of nodes N mounted over the system boards.

Figure 6:
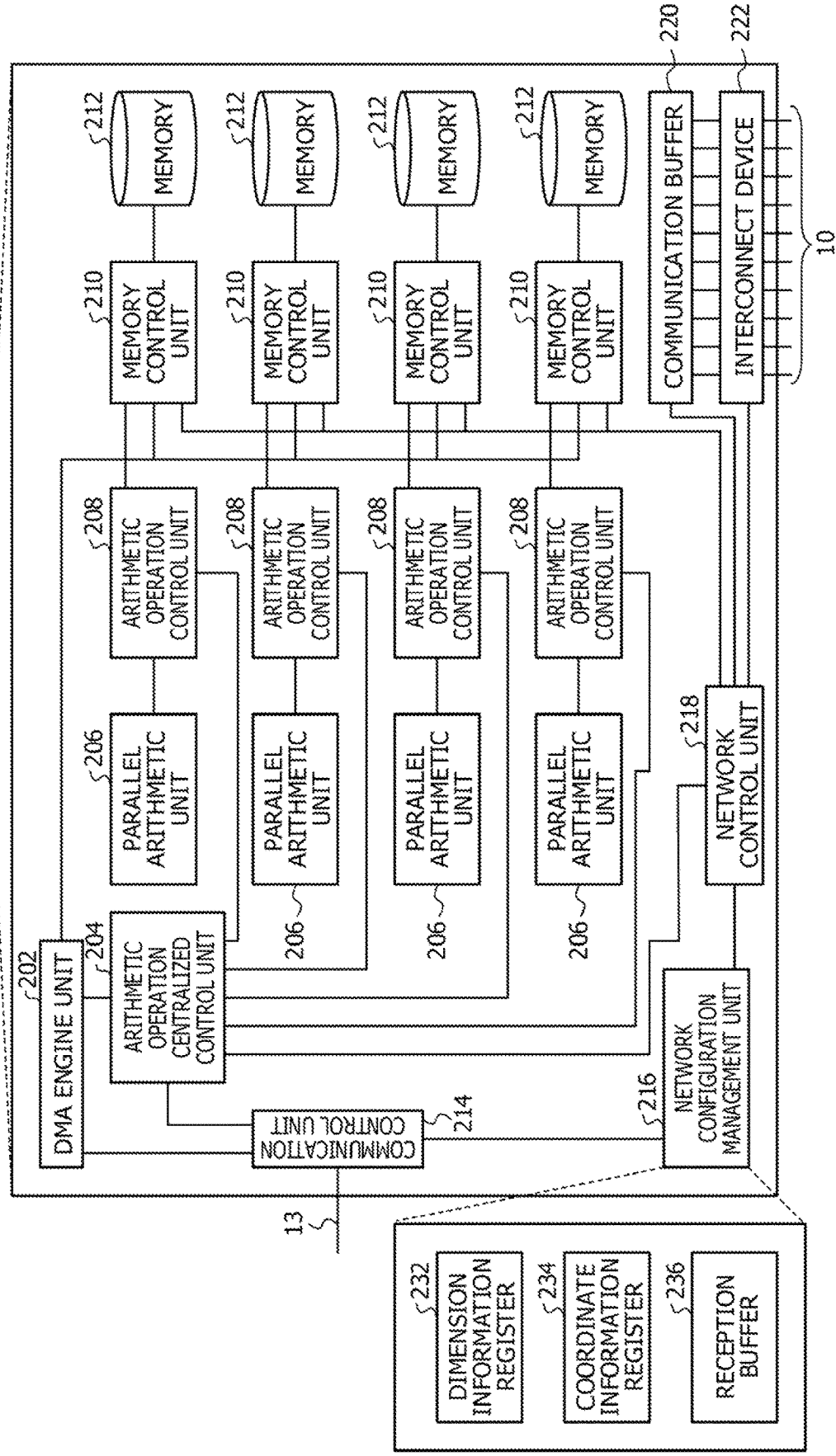
FIG. 6 illustrates an example of a node NA in FIG. 5.

FIG. 6 illustrates an example of the node NA in FIG. 5. The node NA has a direct memory access (DMA) engine unit 202, an arithmetic operation centralized control unit 204, four parallel arithmetic units 206, four arithmetic operation control units 208, four memory control units 210 and four memories 212. The node NA further has a communication control unit 214, a network configuration management unit 216, a network control unit 218, a communication buffer 220 and an interconnect device 222. In the node NA, the components other than the memories 212 may be integrated within one chip. In the node NA, the numbers of the parallel arithmetic units 206, the arithmetic operation control units 208, the memory control units 210 and the memories 212 are not limited to four but may be two or eight. The memories 212 may be shared by a plurality of parallel arithmetic units 206.

The DMA engine unit 202 operates based on an instruction from the communication control unit 214 and the arithmetic operation centralized control unit 204 and, for example, controls transfer of data between the information processing apparatus 20 and the memory control unit 210, not illustrated, coupled through the communication control unit 214 and the communication line 13. The communication control unit 214 controls communication with the information processing apparatus 20, for example, coupled through the communication line 13 based on a Peripheral Component Interconnect (PCI) protocol and controls transfer of an instruction string, data, control information and so on.

The arithmetic operation centralized control unit 204 causes the arithmetic operation control units 208 to control an operation of the parallel arithmetic units 206 based on an instruction received from the information processing apparatus 20 through the communication control unit 214 and controls an operation of the network control unit 218. The parallel arithmetic unit 206 has a plurality of processing units including a product-sum operator and executes a plurality of arithmetic operations in parallel based on an instruction from the arithmetic operation control unit 208. The arithmetic operation control unit 208 controls operations of the parallel arithmetic unit 206 based on an instruction from the arithmetic operation centralized control unit 204.

The memory control unit 210 controls access operations to the memory 212 based on an instruction from the DMA engine unit 202 or the network control unit 218. The memory 212 is, for example, a memory module in which a plurality of memory chips such as dynamic random-access memories (DRAMs) are integrated. The memory 212 holds an operation instruction to be executed by the parallel arithmetic unit 206 and a control instruction to control an operation of the parallel arithmetic unit 206 and holds an operation result acquired by execution of the operation instruction by the parallel arithmetic unit 206.

The network configuration management unit 216 has a dimension information register 232 similar to the dimension information register 15 illustrated in FIG. 3, a coordinate information register 234 that holds identification information (ID) of its node N and coordinate information of its node N, and a reception buffer 236 for test packets. Examples of the coordinate information register 234 and the reception buffer 236 will be described with reference to FIG. 8. The dimension information register 232 has areas, correspondingly to 10 cables 10, that store 10 dimension information pieces to be allocated to 10 cables 10. The dimension information register 232 is an example of a registration unit with which a relationship between the cable 10 and the dimension allocated to the cable 10 is registered.

The network configuration management unit 216 transmits a test packet based on an instruction from the information processing apparatus 20. When the network configuration management unit 216 receives a test packet, the network configuration management unit 216 stores information indicating an ID of the source node N of the test packet in an entry in the reception buffer 236 corresponding to the entry number included in the test packet. The network configuration management unit 216 further outputs the information held in the reception buffer 236 to the information processing apparatus 20 based on an instruction from the information processing apparatus 20. The network control unit 218 manages exchange of information among the arithmetic operation centralized control unit 204, the memory control unit 210, the network configuration management unit 216, the communication buffer 220 and the interconnect device 222.

The communication buffer 220 holds data to be transmitted and be received through the interconnect device 222. The interconnect device 222 is coupled to the interconnect devices 222 in other nodes N through the cables 10. When the interconnect device 222 receives a packet from the communication buffer 220, the interconnect device 222 calculates the dimension direction to transfer a packet in accordance with the rules of the dimension routing with reference to the coordinate information of the transfer destination node N included in the packet. The interconnect device 222 then transfers the packet to the cable 10 (port) to which the calculated dimension direction is allocated.

When the interconnect device 222 receives a packet from another node N and when the coordinate information of the transfer destination included in the received packet is its node N, the interconnect device 222 outputs the packet to the communication buffer 220. When the coordinate information of the transfer destination included in the received packet is another node N, the interconnect device 222 calculates the dimension direction to transfer the packet in accordance with the rules of the dimension routing. The interconnect device 222 transfers the packet to the cable 10 (port) to which the calculated dimension direction is allocated.

Figure 7:
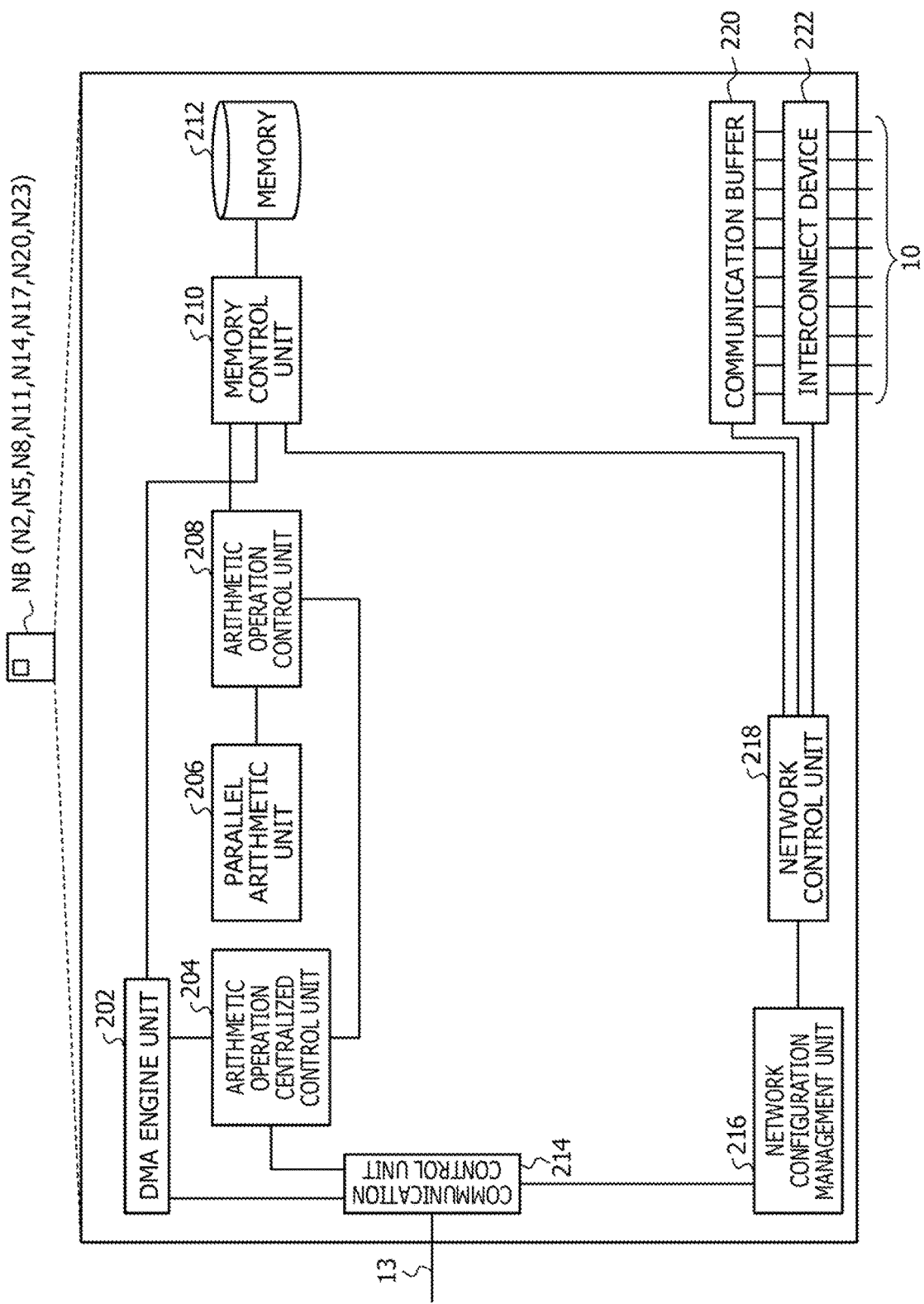
FIG. 7 illustrates an example of a node NB in FIG. 5.

FIG. 7 illustrates an example of the node NB in FIG. 5. Like numbers refer to like parts in FIG. 6 and FIG. 7, and detailed description is omitted. The node NB has the same configuration as that of the node NA except for the node NB has one parallel arithmetic unit 206, one arithmetic operation control unit 208, one memory control unit 210 and one memory 212. In other words, for example, the processing performance of the node NB is lower than the processing performance of the node NA. In the node NB, the components other than the memory 212 may be integrated within one chip. In the node NB, the numbers of the parallel arithmetic units 206, the arithmetic operation control units 208, the memory control units 210 and the memories 212 are not limited to one.

Figure 8:
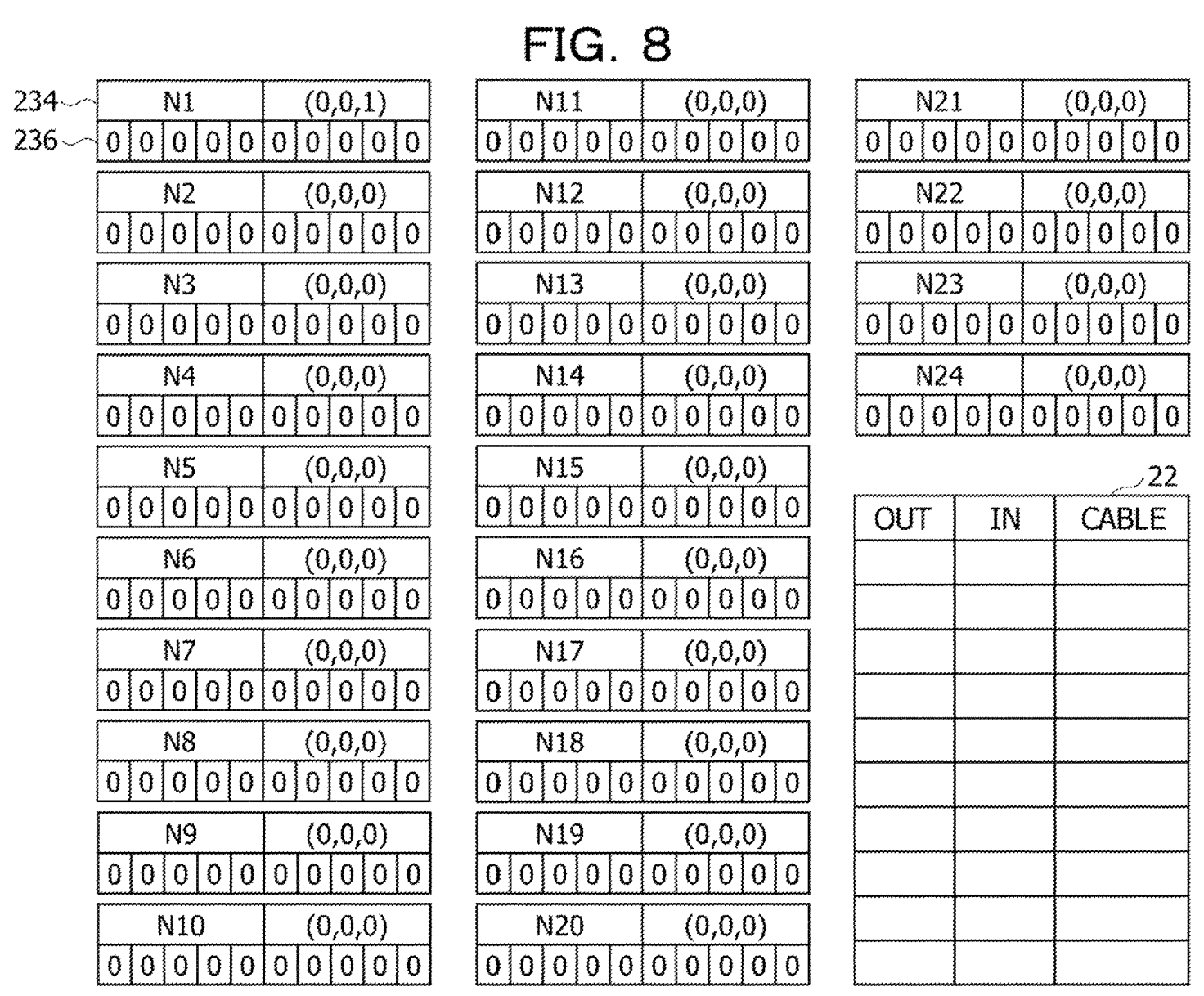
Figure 9:
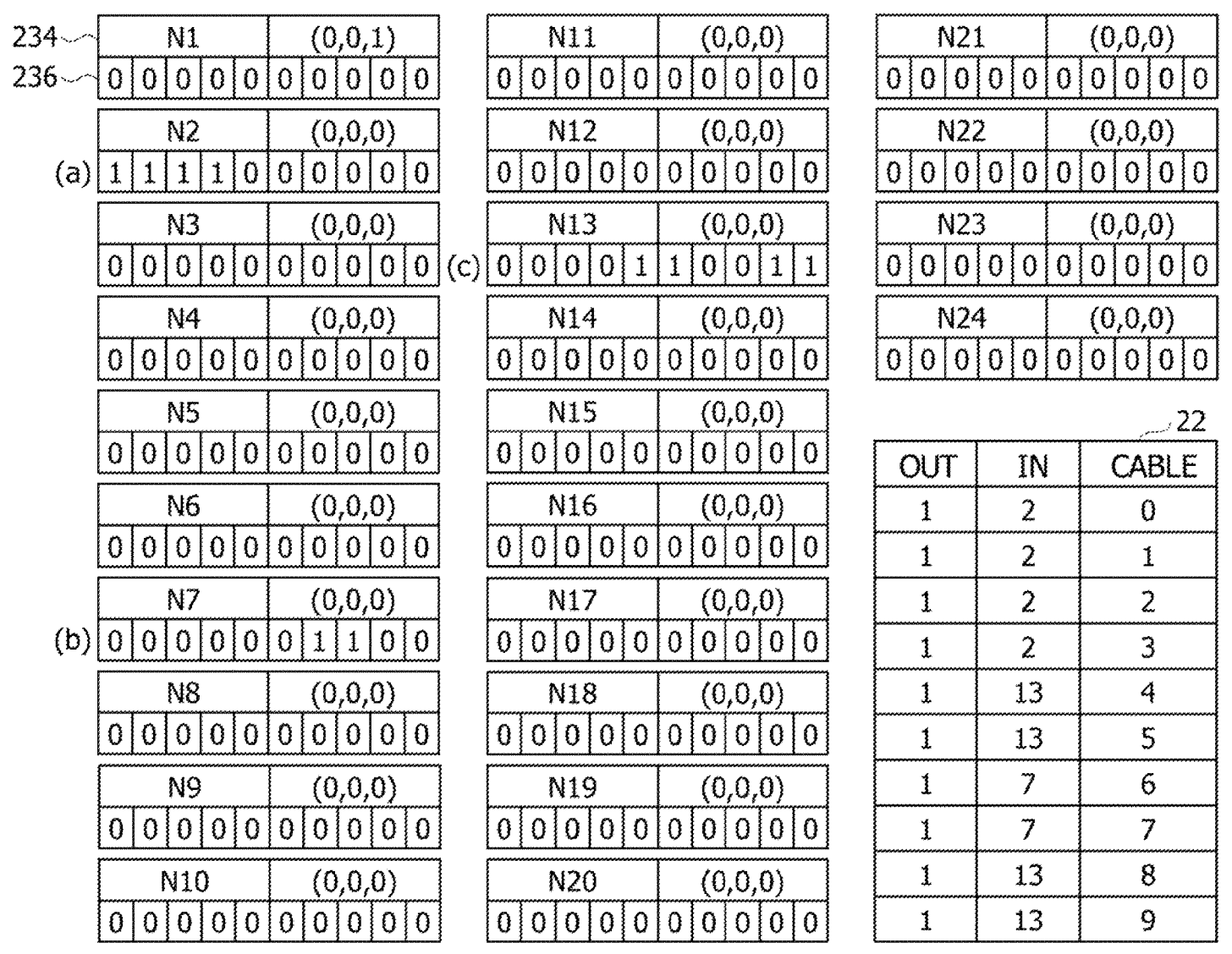
Figure 10:
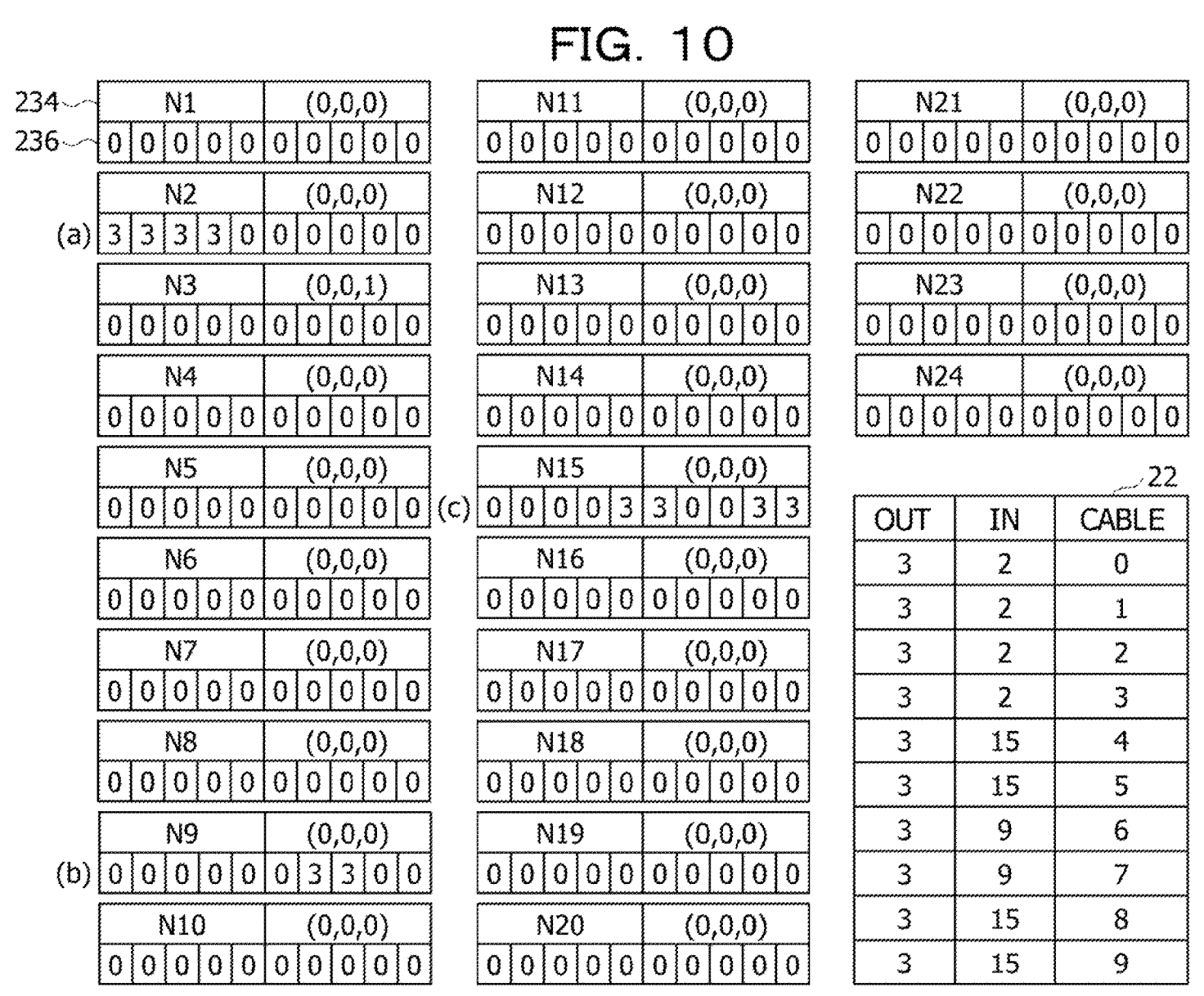

FIGS. 8 to 10 illustrate an example of extraction processing that extracts a coupling relationship between nodes N to be executed by the information processing apparatus 20 in FIG. 5. FIG. 8 illustrates the coordinate information register 234 and the reception buffer 236 included in the nodes N1 to N24 and neighboring information list 22 included in the information processing apparatus 20.

The coordinate information register 234 has areas that hold an ID of its node N and coordinate information (A,B,C) of its node N. In the example illustrated in FIG. 8, the information processing apparatus 20 allocates a temporary ID to each of the nodes N and stores the temporary ID in the coordinate information register 234. For simple description, in FIG. 8, the temporary IDs stored in the coordinate information register 234 are the same as the references of the nodes N1 to N24. The reception buffer 236 has 10 entries corresponding to the number of cables (or ports) coupled to each node N, for example. At an initial state, "0" is set at each entry of the reception buffer 236. The ID is an example of identification information.

The information processing apparatus 20 executes allocation processing that allocates unique coordinate information (A,B,C)=(0,0,1) to the node N1 and allocates common coordinate information (A,B,C)=(0,0,0) to the remaining nodes N2 to N24. The number (="3") of dimensions of the coordinate information is an example. The node N1 to which the unique coordinate information is an example of a first node. Like FIG. 3, the unique coordinate information and the common coordinate information are different by "1" at one of dimensions (such as the dimension C).

Next, the information processing apparatus 20 executes transmission processing that causes transmission of a test packet through 10 cables 10 coupled to the node N1. For example, the test packet includes information (such as "1") indicating the ID of the node N1 and an entry number of the reception buffer 236 of the node N that is a destination of the test packet. For example, the entry number is set to the number of the cable 10 (port) to which the test packet is transmitted. Information included in the test packet is an example of first information.

In this case, the information processing apparatus 20 first writes information allocating the dimension (−C) to the 0th port of the node N1 to the dimension information register 232. For example, the port number is equal to the cable number. The information processing apparatus 20 causes the node N1 to transmit a test packet by defining the destination of the test packet as coordinates (0,0,0) and designating, as a storage destination, the entry of the reception buffer 236 to which the same value (="0") as the cable number for transmitting the test packet is allocated. The information indicating the storage destination of the entry in the reception buffer 236 included in the test packet is an example of storage destination information. Thus, the test packet is transferred to the node N (such as N2) coupled to the node N1 through the cable 10 coupled to the 0th port.

Next, the information processing apparatus 20 writes information allocating the dimension (−C) to the first port of the node N1 to the dimension information register 232. The information processing apparatus 20 causes the node N1 to transmit a test packet by defining the destination of the test packet as coordinates (0,0,0) and designating, as a storage destination, the entry of the reception buffer 236 to which the same value (="1") as the cable number for transmitting the test packet is allocated. Thus, the test packet is transferred to the node N (such as N2) coupled to the node N1 through the cable 10 coupled to the first port.

The information processing apparatus 20 causes the node N1 to transmit a test packet by sequentially rewriting the dimension information register 232 to slide by one the port to which the dimension "−C" is allocated and designating, as a storage destination, the entry of the reception buffer 236 to which the same value as the cable number is allocated. Thus, the test packet is transferred to all of the nodes N directly connected to the node N1 through 10 cables. For example, in the network illustrated in FIG. 5, the test packet is transmitted from the node N1 to the node N2 through four cables 10 and to the node N7 through two cables 10 and to the node N13 through four cables 10.

The neighboring information list 22 illustrated in FIG. 8 has an area ("OUT") that stores the number of the source node N of a test packet and an area ("IN") that stores the number of the destination node N of the test packet correspondingly to the number (0 to 9) of the 10 cables 10. The neighboring information list 22 is provided for each of the nodes N.

FIG. 9 illustrates a state after a test packet is transmitted from the node N1 10 times. The node N2 sequentially receives, from the node N1, test packets designated to be stored at the entry Nos. 0 to 3 of the reception buffer 236 and stores "1" indicating the destination node N1 of the test packets to the entries of Nos. 0 to 3 of the reception buffer 236 (FIG. 9, (a)). The node N7 sequentially receives, from the node N1, test packets designated to be stored at the entry Nos. 6 and 7 of the reception buffer 236 and stores "1" indicating the destination node N1 of the test packets to the entries of Nos. 6 and 7 of the reception buffer 236 (FIG. 9, (b)). The node N13 sequentially receives, from the node N1, test packets designated to be stored at the entry Nos. 4, 5, 8, and 9 of the reception buffer 236. The node N13 stores "1"

indicating the destination node N1 of the test packets in the entries of the Nos. 4, 5, 8, and 9 of the reception buffer 236 (FIG. 9, (c)).

After a test packet is transmitted from the node N1 10 times, the information processing apparatus 20 searches through all of the nodes N1 to N24. The information processing apparatus 20 detects the reception buffer 236 holding "1" at the entries to detect the nodes N having received the test packet from the node N1. The node N1 having transmitted the test packet may be excluded from the nodes to be searched.

Based on "1" stored in the 0th entry of the reception buffer 236 of the node N2, the information processing apparatus 20 determines that the 0th cable of the node N1 is coupled to the node N2. The information processing apparatus 20 stores "1" indicating the node N1 in the "OUT" area corresponding to the cable number "0" and stores "2" indicating the node N2 in the "IN" area corresponding to the cable number "0" in the neighboring information list 22 corresponding to the node N1. In other words, for example, the information processing apparatus 20 stores in the neighboring information list 22 the information that the 0th cable of the node N1 is coupled to the node N2.

Based on "1" stored in the first, second and third entries of the reception buffer 236 of the node N2, the information processing apparatus 20 determines that the first, second and third cables of the node N1 are coupled to the node N2. The information processing apparatus 20 stores "1" indicating the node N1 in the "OUT" areas corresponding to the cable numbers "1", "2", and "3" and stores "2" indicating the node N2 in the "IN" areas corresponding to the cable numbers "1", "2", and "3" in the neighboring information list 22. In other words, for example, the information processing apparatus 20 stores in the neighboring information list 22 the information that the first, second and third cables of the node N1 are coupled to the node N2.

In the same manner, based on the information stored in the reception buffer 236 of the node N7, the information processing apparatus 20 stores information indicating that the sixth and seventh cables of the node N1 are coupled to the node N7 in the neighboring information list 22. Based on the information stored in the reception buffer 236 of the node N13, the information processing apparatus 20 stores information indicating that the fourth, fifth, eighth and ninth cables of the node N1 are coupled to the node N13 in the neighboring information list 22.

The information processing apparatus 20 executes identification processing that identifies to which cable 10 (port) of the node N1 the nodes N2, N7 and N13 having received the test packet from the node N1 are coupled. In other words, for example, by designating the entry of the reception buffer 236 to which a cable number for transmitting a test packet is allocated as a storage destination and transmitting the test packet, which cable 10 of the source node N is coupled to which node N may be detected.

FIG. 10 illustrates a state after a test packet is transmitted from the node N3 10 times. The node N2 sequentially receives, from the node N3, test packets designated to be stored at the entry Nos. 0 to 3 of the reception buffer 236 and stores "3" indicating the destination node N3 of the test packets to the entries of Nos. 0 to 3 of the reception buffer 236 (FIG. 10, (a)). The node N9 sequentially receives, from the node N3, test packets designated to be stored at the entry Nos. 6 and 7 of the reception buffer 236 and stores "3" indicating the destination node N3 of the test packets to the entries of Nos. 6 and 7 of the reception buffer 236 (FIG. 10, (b)). The node N15 sequentially receives, from the node N3, test packets designated to be stored at the entry Nos. 4, 5, 8, and 9 of the reception buffer 236. The node N15 stores "3" indicating the destination node N3 of the test packets in the entries of the Nos. 4, 5, 8, and 9 of the reception buffer 236 (FIG. 10, (c)).

Referring to FIG. 10, the information processing apparatus 20 transmits a test packet from the node N3 10 times and then searches through all nodes N1 to N24, detects the reception buffer 236 holding "3" at the entries to detect the nodes N having received the test packet from the node N3. As in the description with reference to FIG. 9, the information processing apparatus 20 executes identification processing that identifies to which cable 10 (port) of the node N3 the nodes N2, N9 and N15 having received the test packet from the node N3 are coupled.

Referring to FIGS. 9 and 10, after information "1" indicating the node N1 is stored in the 0th to third entries of the reception buffer 236 of the node N2, "3" indicating the node N3 is rewritten. However, every time the information processing apparatus 20 changes the node N to transmit a test packet and transmits the test packet to 10 cables 10, the information processing apparatus 20 generates the neighboring information list 22 with reference to the reception buffers 236 of all of the nodes N. Thus, even when the information held in the reception buffer 236 is overwritten, a correct neighboring information list 22 may be generated. The reception buffer 236 stores the number of the node N having transmitted a test packet, and the number of the node N differs every time the neighboring information list 22 is generated. Without clearing the reception buffer 236 every time the node N to transmit a test packet is changed, the information processing apparatus 20 may generate a correct neighboring information list 22.

Like the processing described with reference to FIGS. 9 and 10, the information processing apparatus 20 executes the allocation processing, the transmission processing and the identification processing on all of the nodes N and generates a neighboring information list 22 every time. Based on the generated 24 neighboring information lists 22, the information processing apparatus 20 extracts a coupling relationship between nodes N. For example, from FIG. 9, information indicating that the 0th cable 10 of the node N1 is coupled to the node N2 may be identified, but which cable 10 of the node N2 the 0th cable 10 of the node N1 is coupled to may not be identified.

However, based on the neighboring information list 22 generated after a test packet is transmitted from the node N2, it is identified that the second cable 10 of the node N2, for example, is coupled to the node. N1. Thus, it may be identified that the 0th cable 10 of the node N1 is coupled to the second cable 10 of the node N2.

Figure 11:
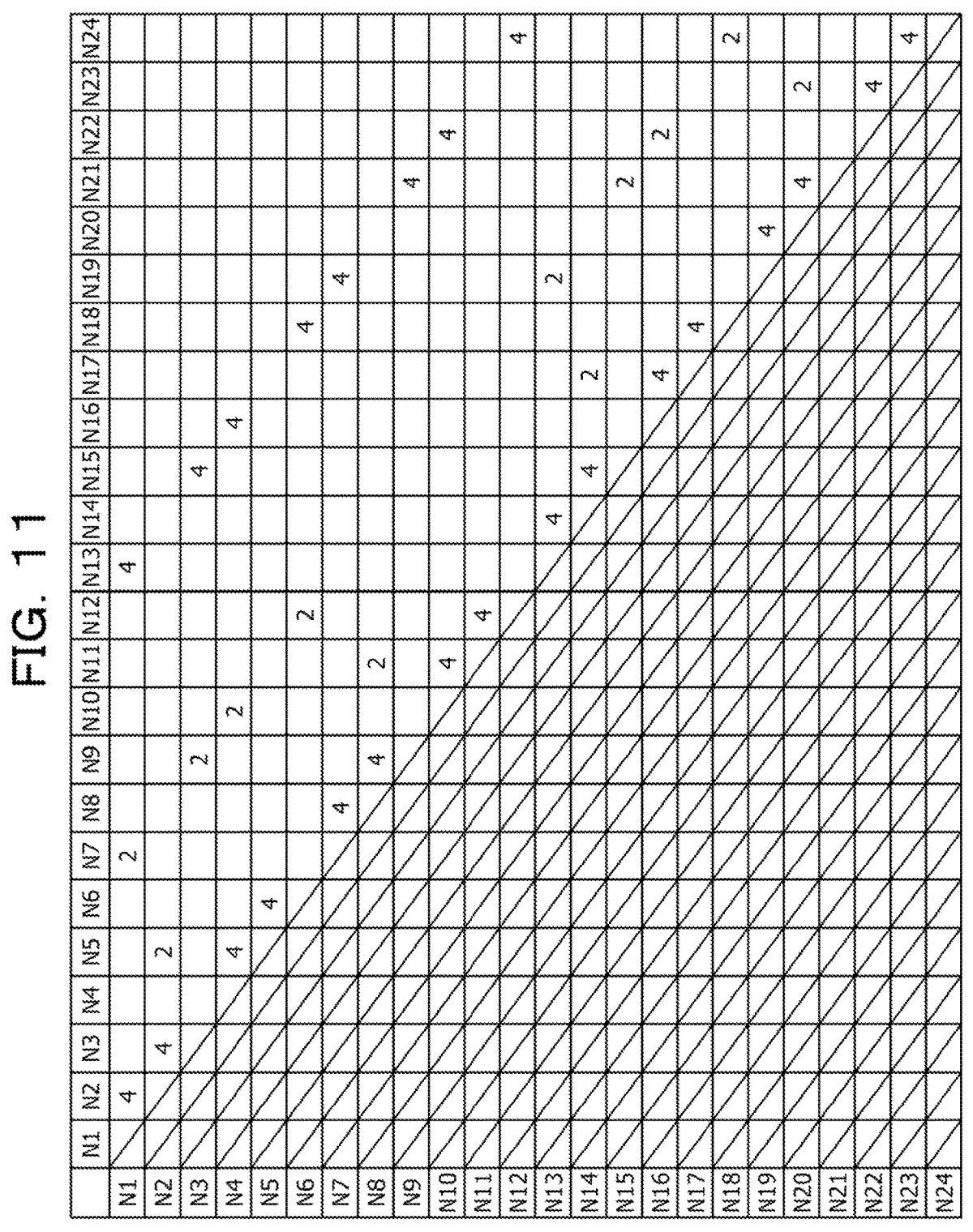

FIG. 11 illustrates an example of a coupling relationship between nodes N1 to N24 found out after test packets are transmitted from all nodes N and the processing illustrated in FIGS. 9 and 10 are executed thereon. Though the numbers of the cables 10 coupling between nodes N are identified in reality, it is omitted in FIG. 11. FIG. 11 illustrates the number of cables coupling between nodes N.

Figure 12:
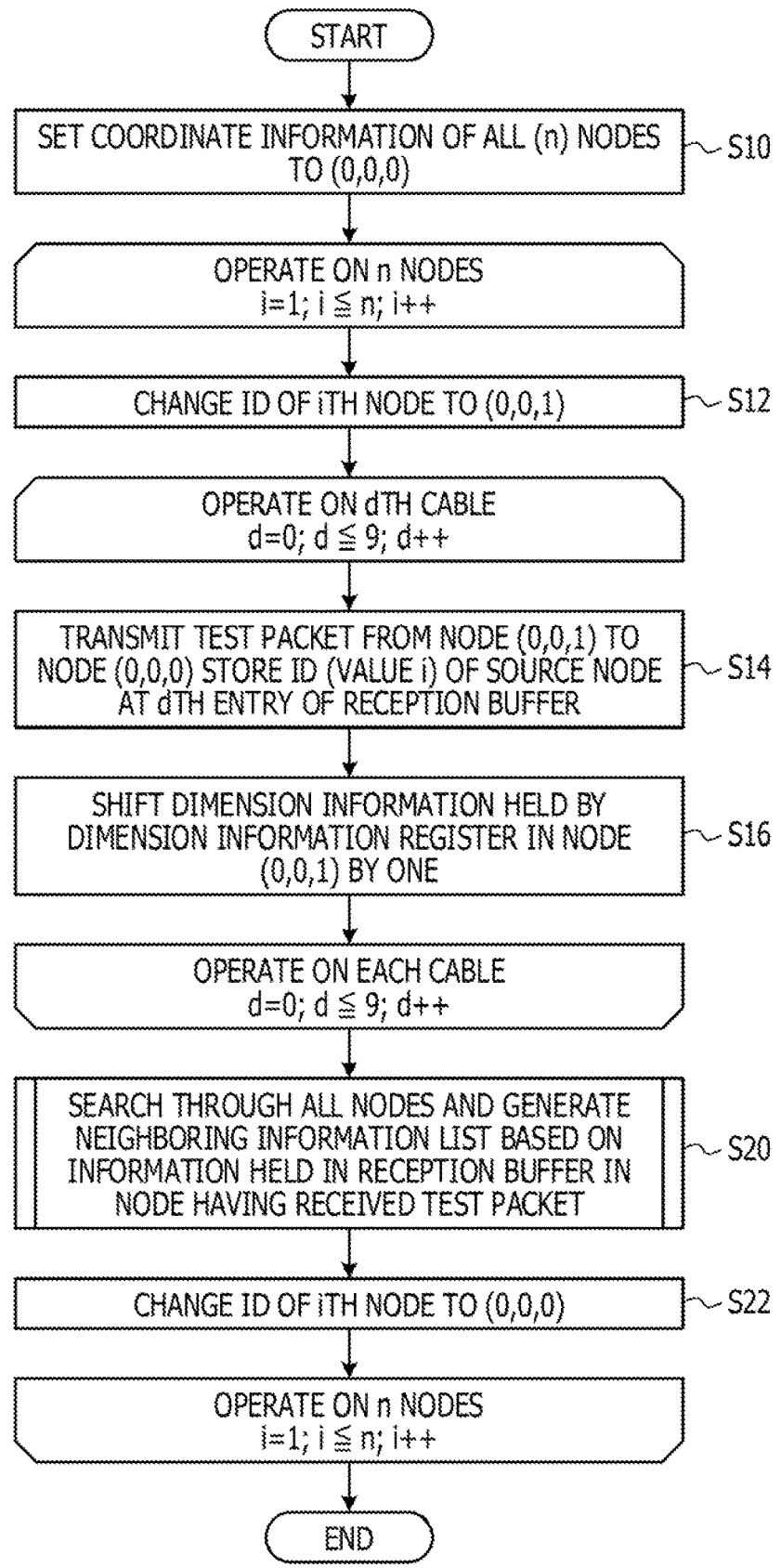
FIG. 12 illustrates an example of an operation flow of the information processing apparatus in FIG. 5.
Figure 13:
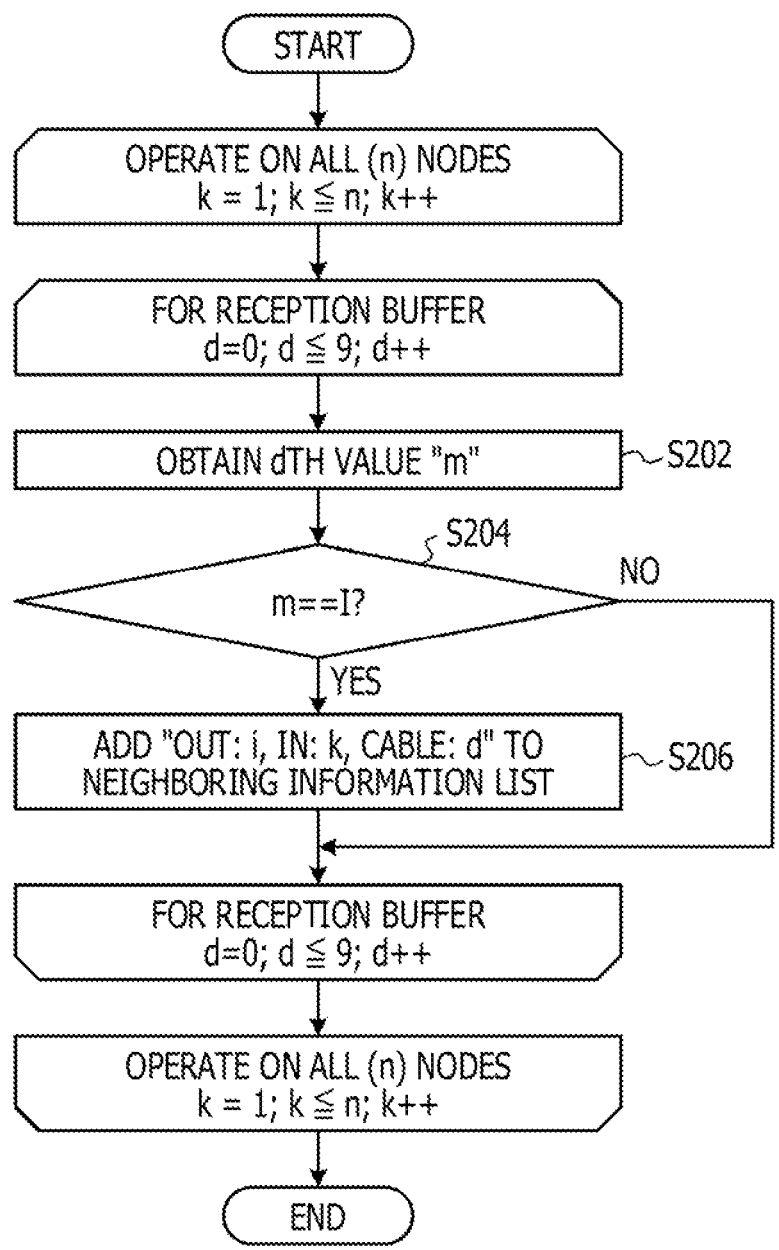
FIG. 13 is a diagram illustrating an example of step S20 of 12.

FIGS. 12 and 13 illustrate operation flows of the information processing apparatus 20 in FIG. 5. The flows illustrated in FIGS. 12 and 13 are implemented by execution of an information processing program by the information processing apparatus 20. In other words, for example, FIGS. 12 and 13 illustrate an example of an information processing method by the information processing apparatus 20 and an example of an information processing program. In the flows illustrated in FIGS. 12 and 13, the information processing apparatus 20 performs an operation that extracts a coupling relationship between nodes N illustrated with reference to FIGS. 8 to 11.

First of all, in step S10 in FIG. 12, the information processing apparatus 20 sets (0,0,0) as coordinate information of all nodes N. The processing from step S12 to step S22 is executed on each of all of the (n) nodes N.

In step S12, the information processing apparatus 20 changes the coordinate information of the ith node N to (0,0,1). The processing in step S14 and S16 is executed on each of the 10 cables. In step S14, the information processing apparatus 20 uses the dth cable 10 to transmit a test packet from the node N with coordinate information (0,0,1) to the nodes N with coordinate information (0,0,0). The test packet includes the ID (="i") of the source node N and the number d (=cable number) of the entry in the reception buffer 236 of the destination node N. The node N having received the test packet stores the ID (="i") of the source node N included in the test packet in the dth entry of the reception buffer 236.

Next, in step S16, the information processing apparatus 20 rewrites the dimension information register 232 of the source node N of the test packet and shifts the cable 10 (port) to transmit the test packet by one, like FIG. 3.

When a test packet is transmitted from the test packet source node N to 10 cables 10, the information processing apparatus 20 in step S20 searches through all of the nodes N. The information processing apparatus 20 generates a neighboring information list 22 based on information held in the reception buffer 236 of the nodes N having received the test packet. An example of the processing in step S20 is illustrated in FIG. 13.

Next, in step S22, the information processing apparatus 20 changes the ID of the ith node N to (0,0,0). When the operations have not completed on all of the nodes N, the information processing apparatus 20 returns the processing to step S12. When the operations have completed on all of the nodes N, the processing is ended.

FIG. 13 illustrates an example of step S20 of FIG. 12. The processing from step S202 to S206 is executed by designating each of all (n) nodes N as searching targets, and the processing is executed on each of 10entries (d="0" to "9") of the reception buffer 236 for each node N.

In step S202, the information processing apparatus 20 obtains a value m of the dth entry of the reception buffer 236 of the searching target node N. Next, in step S204, when the value m indicates the source node N ("i") of the test packet, the information processing apparatus 20 moves the processing to step S204, When the value m indicates the source node N ("i") of the test packet, the information processing apparatus 20 moves the processing to step S206. When the value m does not indicate the source node N ("i") of the test packet, the information processing apparatus 20 executes the following determination processing.

In the determination processing, when the value m does not indicate the test packet source node N (="i") and values of all entries in the reception buffer 236 have not been obtained, the information processing apparatus 20 returns the processing to step S202. When the value m does not indicate the test packet source node N (="i") and values of all entries in the reception buffer 236 have been obtained, the information processing apparatus 20 updates, (k+1), the search target node N, resets the value d to "0" and returns the processing to step S202. When the value m does not indicate the test packet source node N (="i") and the search through all nodes N have completed, the information processing apparatus 20 ends the processing.

In step S206, the information processing apparatus 20 stores "i" in the "OUT" area and "k" in the "IN" area, and "d" in the "CABLE" area in the neighboring information list 22. When values of all entries of the reception buffer 236 have not been obtained, the information processing apparatus 20 returns the processing to step S202. When values of all entries in the reception buffer 236 have been obtained, the information processing apparatus 20 updates, (k=k+1), the search target node N, resets the value d to "0" and returns the processing to step S202. When all of the nodes N are searched, the information processing apparatus 20 ends the processing.

Also according to the embodiment described with reference to FIG. 5 to FIG. 13, the coupling condition between nodes N may be grasped in a network in which the coupling relationship between nodes N is unknown, like the embodiment described with reference to FIG. 1 to FIG. 4. Coordinate information is allocated to each of nodes based on the grasped coupling condition so that a network including coordinate information may be constructed.

The coordinate information of the test packet source node N and the coordinate information of the other nodes are differentiated by "1" at one dimension so that a test packet may be transmitted even when the coupling relationship between nodes N is unknown. Thus, the node N directly connected to the test packet source node N may receive the test packet.

The correspondence between the dimension information (−C) to be set at the dimension information register 232 of the test packet source node N and the cable number is sequentially shifted every time a test packet is transmitted. Thus, in a method that transfer packet by dimension routing, a test packet is sequentially transferred to the nodes N directly connected to the test packet source node N even when the coupling relationship between the nodes N is unknown.

According to the embodiment described with reference to FIGS. 5 to 13, temporary IDs are allocated to all nodes N, and the temporary IDs of the test packet source node N are included in the test packet before the coupling relationship between the nodes N is extracted. Thus, the ID of the test packet source node N may be stored in the reception buffer 236 of the nodes N having received the test packet so that the neighboring information list 22 may be generated. In other words, for example, the coupling information between the nodes N may be extracted.

The information processing apparatus 20 includes, in a test packet, the ID of the source node N and the entry number of the storage destination in the reception buffer 236 of the destination node N. The node N having received the test packet is caused to store the ID of the source node N included in the test packet in the entry designated as the storage destination of the reception buffer 236. Thus, the information processing apparatus 20 may determine to which cable 10 of the test packet source node N the node N having received the test packet is coupled based on the information held in the reception buffer 236. By transmitting a test packet from all of the nodes N, the information processing apparatus 20 may determine the ports of the other nodes N to which each cable of each of the nodes N is coupled and extract the coupling information between nodes N.

The characteristics and advantages of the embodiments become apparent from the above detailed description. This is intended to extend to the features and advantages of the embodiments as described above as long as the claims are not departing from the gist of the claims and the scope of right. Also, one skilled in the art is able to easily make any modifications and changes. Therefore, it is not intended that the scope of the embodiments having inventiveness be limited to the aforementioned embodiments, and it is possible to be based on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus coupled to a plurality of nodes in a N-dimensional torus structure (N is a natural number) having N direction, each of the plurality of nodes being a computer having: one or more of processors, one or more of memory, and a plurality of communication nodes, each of the plurality of nodes being mutually coupled to each adjacent node among the plurality of nodes via at least any one of the plurality of communication ports, the information processing apparatus comprising:
a memory;
a processor coupled to the memory, the processor being configured to:
sequentially select, as a first node, each of the plurality of nodes in the N-dimensional torus structure to cause the selected first node to execute first processing, the first processing including
executing allocation processing that allocates first coordinate information to the first node and allocates, to each adjacent node, second coordinate information indicating a coordinate value same as all nodes adjacent to the first node,
executing transmission processing that
generates, for each of the plurality of communication ports included in the first node, first information including a first item indicating the first node and a second item indicating the each of the plurality of communication ports to be used for transmitting of the first information, and
sequentially outputs, from each of the plurality of communication ports included in the first node, the generated corresponding first information to each adjacent node of the plurality of nodes, each of the plurality of nodes being configured to update, in response to receiving of the first information from the first node, network configuration information such that the network configuration information includes the communication port indicated by the second item of the received first information and information corresponding to the first node indicated by the first item of the received first information; and
in response to completion of the executing of the first processing for all of the plurality of nodes, execute identification processing that
collects, from each of the plurality of nodes, the updated network configuration information,
combines the collected network configuration information from the plurality of nodes to generate the combined network configuration information, and
identifies, for each of the plurality of nodes, connection relations between the each of the plurality of nodes and respective adjacent nodes in each of the N directions in the N-dimensional torus structure.

2. The information processing apparatus according to claim 1, wherein
the first information transmitted from the first node further includes coordinate information indicating a destination node being one of the plurality of nodes other than the first node,
each of the plurality of nodes has a processor configured to: receive the first information through any of the plurality of communication ports; determine, based on a difference between the coordinate information of the destination node indicated in the received first information and coordinate information of the each of the plurality of nodes, a direction that is any one of the N directions in the N-dimensional torus structure; and transfer the received first information to, among the plurality of communication ports, a destination port to which the determined direction is allocated, and
the first coordinate information and the second coordinate information are different by "1" at any one of the N directions in the N-dimensional torus structure.

3. The information processing apparatus according to claim 2, wherein each of the plurality of nodes has a memory configured to store a relationship between each of the plurality of communication ports and a corresponding direction allocated to the each of the plurality of communication ports.

4. The information processing apparatus according to claim 1, wherein
the first item included in the first information further includes identification information identifying the first node,
the second item included in the first information further includes storage destination information indicating a storage destination in a reception buffer, the storage destination indicating a position to store in the reception buffer the identification information indicated by the first item, and
the identifying of the connection relations includes identifying, based on a storage position of the reception buffer storing the identification information, the connection relation that indicates a relation between a communication port having transmitted the first information from the first node and a communication port having received the first information at a node adjacent to the first node.

5. The information processing apparatus according to claim 1, wherein, before the executing of the first processing, temporary identification information is allocated to each of the plurality of nodes.

6. The information processing apparatus according to claim 1, wherein coordinate information is allocated to each of the plurality of nodes based on the identified connection relations.

7. An information processing method implemented by a computer coupled to a plurality of nodes in a N-dimensional torus structure (N is a natural number) having N directions, each of the plurality of nodes being a computer having: one or more of processors, one or more of memory, and a plurality of communication nodes, each of the plurality of nodes being mutually coupled to each adjacent node among the plurality of nodes via at least any one of the plurality of communication ports, the information processing method comprising:

sequentially selecting, as a first node, each of the plurality of nodes in the N-dimensional torus structure to cause the selected first node to execute first processing, the first processing including executing allocation processing that allocates first coordinate information to the first node and allocates, to each adjacent node, second coordinate information indicating a coordinate value same as all nodes adjacent to the first node, executing transmission processing that generates, for each of the plurality of communication ports included in the first node, first information including a first item indicating the first node and a second item indicating the each of the plurality of communication ports to be used for transmitting of the first information, and sequentially outputs, from each of the plurality of communication ports included in the first node, the generated corresponding first information to each adjacent node of the plurality of nodes, each of the plurality of nodes being configured to update, in response to receiving of the first information from the first node, network configuration information such that the network configuration information includes the communication port indicated by the second item of the received first information and information corresponding to the first node indicated by the first item of the received first information; and in response to completion of the executing of the first processing for all of the plurality of nodes, executing identification processing that collects, from each of the plurality of nodes, the updated network configuration information, combines the collected network configuration information from the plurality of nodes to generate the combined network configuration information, and identifies, for each of the plurality of nodes, connection relations between the each of the plurality of nodes and respective adjacent nodes in each of the N directions in the N-dimensional torus structure.

8. A non-transitory computer-readable storage medium storing a program which causes a computer to perform processing, the computer being configured to be coupled to the plurality of nodes in a N-dimensional torus structure (N is a natural number) having N directions, each of the plurality of nodes being a computer having: one or more of processors, one or more of memory, and a plurality of communication nodes, each of the plurality of nodes being mutually coupled to each adjacent node among the plurality of nodes via at least any one of the plurality of communication ports, the processing comprising:

sequentially select, as a first node, each of the plurality of nodes in the N-dimensional torus structure to cause the selected first node to execute first processing, the first processing including executing allocation processing that allocates first coordinate information to the first node and allocates, to each adjacent node, second coordinate information indicating a coordinate value same as all nodes adjacent to the first node, executing transmission processing that generates, for each of the plurality of communication ports included in the first node, first information including a first item indicating the first node and a second item indicating the each of the plurality of communication ports to be used for transmitting of the first information, and sequentially outputs, from each of the plurality of communication ports included in the first node, the generated corresponding first information to each adjacent node of the plurality of nodes, each of the plurality of nodes being configured to update, in response to receiving of the first information from the first node, network configuration information such that the network configuration information includes the communication port indicated by the second item of the received first information and information corresponding to the first node indicated by the first item of the received first information; and in response to completion of the executing of the first processing for all of the plurality of nodes, executing identification processing that collects, from each of the plurality of nodes, the updated network configuration information, combines the collected network configuration information from the plurality of nodes to generate the combined network configuration information, and identifies, for each of the plurality of nodes, connection relations between the each of the plurality of nodes and respective adjacent nodes in each of the N directions in the N-dimensional torus structure.

\* \* \* \* \*